United States Patent [19]

Price et al.

[11] 3,853,984

[45] Dec. 10, 1974

[54] CONTROLLING THE LEACHING OF KAOLIN CLAY

[75] Inventors: Charles R. Price; William F. Abercrombie, Jr., both of Macon, Ga.

[73] Assignee: J. M. Huber Corporation, Huber, Ga.

[22] Filed: Oct. 17, 1973

[21] Appl. No.: 407,065

[52] U.S. Cl. .............. 423/131, 106/68, 106/288 B, 204/1 T, 423/328
[51] Int. Cl. ..................... C01b 33/00, C01b 33/26
[58] Field of Search ........... 423/111, 115, 118, 131, 423/328, 327; 206/72, 288

[56] References Cited
UNITED STATES PATENTS

| | | | |
|---|---|---|---|
| 3,399,960 | 9/1968 | Conley | 423/131 |
| 3,486,847 | 12/1969 | Steinhausen | 204/1 T |
| 3,573,943 | 4/1971 | Rowse et al. | 106/288 |

OTHER PUBLICATIONS

Conley, et al., "Improvements of Iron Bleaching in Clays Through Potentiometric Control of Sodium Dithionite Addition," I & E C Process Design & Development, Vol. 3, No. 2, pages 183–188, April 1964.
Conley & Lloyd, "Improvements of Iron Leaching in Clays," I & E C Process Design & Development, Vol. 9, No. 4, pages 595–601, 1970.

Primary Examiner—John H. Mack
Assistant Examiner—Aaron Weisstuch

[57] ABSTRACT

A process for improving the leaching of kaolin clays to provide high grade kaolin clay products having improved optical properties and minimum viscosities upon dispersion with a minimum amount of leaching compound is disclosed. The inventive process comprises forming a continuous flow stream of a dispersed kaolin clay aqueous slurry, adding thereto a leaching compound containing an active $(S_2O_4)^=$ group or a compound capable of liberating such groups in the slurry, and regulating the amount of leaching compound added to the clay slurry to prevent overleaching. Leaching compound addition is regulated or controlled by measuring the oxidation-reduction potential of the leaching reaction at a specified time period of at least about 20 minutes after initial leaching compound addition by inserting the electrode assembly of an oxidation-reduction potentiometric cell into the continuous flow stream and reading the electric potential between the electrodes, and then adjusting the amount of leaching compound added to the clay slurry to provide an electromotive force potential reading value of about −450 to about −300 millivolts as read with a saturated calomel cell reference electrode and a dithionite-conditioned platinum measuring electrode.

13 Claims, No Drawings

CONTROLLING THE LEACHING OF KAOLIN CLAY

BACKGROUND OF THE INVENTION

1. Field of the Invention

The present invention relates to kaolin clay products and, more particularly, pertains to a process for improving the leaching of kaolin clays for removing color impurities therein.

2. Description of the Prior Art

Many natural kaolin clays, as mined, are discolored by the presence of iron-stained titaniferous mineral contaminants. It is common practice in the industry to upgrade the color of natural clays by treating the clays with leaching agents to reduce some portion of the color contaminants to soluble salts that can be removed by filtration and/or washing of the leached clays. Generally, the most conventional leaching procedure is to form a continuous flow stream of an aqueous suspension or dispersion of the clay after coarse contaminants have been removed, acidify the slurry to a pH of from about 3.0 to 4.5 and add a leaching compound or agent to the stream. There are many leaching or reducing agents known in the art, e.g., dithionite leaching compounds and the like. Presently, it is common practice in the industry to employ dithionite leaching compounds containing an active $(S_2O_4)^=$ group or a combination of chemicals known to liberate such a group. In addition, in present practice, the acidification step is normally accomplished by the addition of flocculating agents such a aluminum sulfate, sulfuric acid, hydrochloric acid, etc. and mixtures thereof. After leaching, the stream is filtered to remove soluble impurities and the leached clay is dispersed or washed and dried.

In the above-described leaching process, the ferric iron of the iron-stained titaniferous mineral contaminants is reduced to the ferrous iron be reaction with the dithionite leaching compound. The ferrous iron reaction product is soluble and can be readily removed from the clay by conventional washing and filtration procedures. The reaction of the ferric iron contaminant of the clay and the dithionite leaching compound is commonly known in the art as an oxidation-reduction reaction and is illustrated as follows:

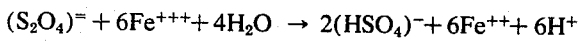

$$(S_2O_4)^= + 6Fe^{+++} + 4H_2O \rightarrow 2(HSO_4)^- + 6Fe^{++} + 6H^+$$

There are many variables involved which affect the leaching reaction, especially where it is performed in a continuous manner. For example, the amount of ferric contaminants in the clay will vary from sample to sample. Thus, the optimum amount of leach required will change periodically as clay is leached in a continuous procedure. In addition, when a dithionite leaching compound is employed, other reactions occur in the aqueous clay slurry-leaching compound mixture. For example, the dithionite compound also reacts with water and/or oxygen present to produce end products such as sulfides, thiosulfates, and the like. These competing reactions naturally reduce the amount of dithionite available for the oxidation-reduction reaction with the ferric iron-containing contaminants and, accordingly, affect the leach dosage required. Other variables which have been found to affect the leaching reaction include pH of the clay slurry-leaching compound mixture, temperature during reaction, concentration of clay in the aqueous slurry, clay particle size, and the length of time the leach reaction is allowed to continue before washing and filtration. There are, of course, other variables involved which are known to those skilled in the art.

In face of the many variables involved, it has been difficult to determine the adquate amount of leaching compound to employ in the leaching of kaolin clays to provide high grade kaolin clay products having specified brightness and adequate minimum viscosities upon dispersion. At present, it is common practice in the industry to determine adequate leach dosage by leaching several samples of a particular clay slurry to be leached with differing dosages or amounts of a leaching compound under controlled laboratory conditions to determine what amount of leaching compound will produce the desired rheological properties. It is readily apparent that this conventional trial and error procedure has several disadvantages, such as:

1. No compensation can be allowed for periodic changes in the strength of the leaching compound employed or in the amount of ferric iron contaminant in the clay under the continuous plant conditions.
2. No compensation can be made for periodic changes under continuous plant operating conditions of the many operating parameters which affect the leach reaction, such as temperature, time, pH, flow rate, clay particle size, etc.
3. A considerable time lag results between the actual continuous plant leaching procedure and the recorded laboratory results.
4. A sizable amount of labor is necessary to continuously monitor the brightness of all plant production streams.

Presently, it is common practice in the industry to employ excess amounts of leaching compound in commercial continuous plant operations in order to avoid the possibility of inadequate leaching. However, this common practice is not only uneconomical through the waste of the leaching compound, but can also lead to overleaching of the clay. overleaching can deleteriously affect the overall rheological properties of the finished clay product. For example, experiments have shown that overleaching not only causes a reduction in optimum brightness of the finished clay product, but adversely increases the viscosities of the finished clay products when they are dispersed for use as well.

It is known that the oxidation-reduction leach reaction between dithionite leaching compound and ferric iron contaminant in clays produces an electric potential which is commonly termed oxidation-reduction potential. The oxidation-reduction electric potential (electromotive force potential) of the reaction can be measured by commercially available potentiometric cells comprised of reference electrodes, measuring electrodes, oxidation-reduction (redox) potentiometers, and the like. Various types of known apparatus for redox electrical potential measurement will be discussed in more particularity hereafter.

Robert F. Conley's and Mary K. Lloyd's article "Improvement of Iron Leaching in Clays, in Ind. Eng. Chem. Process Des. Develop.", Vol. 9, No. 4, 1970, pp. 595–601, describes the use of platinum electrode potentiometry for studying the processing parameters of the leach reaction between sodium dithionite and ferric iron in clays. In the reference, clay particle size, temperature, acidity, and other parameters of the leach reaction are studied by the use of potentiometric measurement which is said to correlate well with optical properties.

Recently, several attempts have been made to improve the leaching of kaolin clays by taking advantage of the fact that the leach reaction produces a measurable electrical potential. For example, U.S. Pat. No. 3,399,960 and Canadian Pat. No. 810,105 teach that the leaching of kaolin clays can be improved by controlling the length of time a specified amount of dithionite leaching compound is allowed to react with the contaminants in a suspended clay slurry by redox potentiometric measurement. More particularly, both patents disclose that improved brightness can be obtained and deterioration of the final clay product can be prevented by inserting a calomel reference electrode and a dithionite-conditioned platinum electrode of a potentiometric cell into an aqueous dithionite-clay slurry mixture which has the dithionite leaching compound added at a known amount, maintaining the leach-clay slurry mixture while the negative electric potential between the electrodes becomes more positive and discontinuing the leaching operation before the negative potential reading on the potentiometer drops below a negative value of about −300 millivolts. Both of the patents describe that discontinuing the leaching operation, such as by dewatering, washing and filtering the leaching compound-clay mixture, before the negative value of −300 millivolts is reached, prevents brightness deterioration of the finished clay product. However, the disclosed process is disadvantageous inasmuch as there is no way to control the amount of leaching compound employed. Substantially immediately after a dithionite compound is added to an aqueous clay slurry, the negative potential reaches a value above about −300 no matter what the amount or dosage of leaching compound is. Hence, a reading of −300 millivolts could be obtained by employing too little or too much dithionite leaching compound which would result in a clay product which is inadequately leached or which contains excessive unreacted dithionite leached compound. The presence of excessive unreacted dithionite leached compound would not necessarily affect optical properties (brightness) but would seriously affect rheological properties of the finished clay product, particularly the viscosity upon dispersion. The process disclosed in the patents also has the further disadvantage of being a batch-wise procedure. The process is not applicable to continuous clay leaching, inasmuch as the time required to reach −300 millivolts when a specified amount of leach compound is employed would be too highly variable for continuous control.

U.S. Pat. No. 3,573,943 to Rowse, et al describes a process to control the addition of dithionite leaching compound to a clay slurry by polarographic measurement. More particularly, patentees teach the process of dispersing an aqueous solution of a dithionite leaching compound into an aqueous clay slurry flowing stream at a known rate, passing a quantity of the stream at a steady rate of flow, after about one-fourth minute to 30 minutes after dithionite dispersion, through a housing containing an electrode assembly for a polarograph, measuring the polarographic diffusion current, and, if necessary, adjusting the rate at which the dithionite compound is dispersed into the clay slurry flowing stream to insure that the concentration of the dithionite compound in the stream is at a desired level. Although the disclosed process appears to be an improvement over the conventional process for leaching clays, it has the disadvantage of employing a polarograph electrode assembly for measuring the polarographic diffusion current which corresponds only to the dithionite ion concentration in the flow stream and which does not necessarily correspond to the clay leaching reaction. The employment of a polarographic measurement control requires specific knowledge of the amount of dithionite first added to the clay slurry stream and the leach strength for meaningful measurement. In addition, it requires diverting or tapping off a portion of the dithioniteclay stream and passing the diverted portion past the electrode assembly at a known flow rate and maintaining the flow rate constant at all times during measurements. Maintaining a constant flow rate requires tedious control of the process stream and would be most difficult especially in view of the tendency of clay to build up or cake in the polarograph housing. Moreover, the mercury dropping electrode of the polarograph assembly requires adjustment of mercury drop size, drop time and other variables which must be adjusted and continuously monitored in order to provide a polarographic diffusion current reading continuously corresponding to the dithionite concentration remaining in the dithionite-clay stream being measured. This would require constant monitoring and adjustment by highly skilled personnel which would lead to increased finished clay production costs.

We have discovered an improved process for the leaching of kaolin clays which overcomes the disadvantages of the prior art enumerated hereinbefore. Through the practice of the present invention, overleaching of kaolin clay slurries is prevented by regulating the amount of leaching compound required to reduce the ferric iron contaminants of a given clay slurry to provide a high grade kaolin clay product having overall improved optical properties and minimum viscosities upon dispersion with a minimum amount of leach compound. Moreover, the inventive process can be carried out continuously without constant control by highly skilled labor.

Accordingly, it is a principal object of the present invention to provide a continuous process for improving the leaching of kaolin clays to provide high grade kaolin clay products having optimum desirable optical and rheological properties with the employment of a minimum amount of leaching compound.

It is another object of the present invention to provide an improved process for controlling the amount of leaching compound employed in the leaching of kaolin clays to prevent overleaching thereof.

It is yet another object of the invention to provide a continuous process for the leaching of kaolin clays whereby the optimum amount of leaching compound required can be controlled substantially automatically irrespective of the changes in leach strength and/or contaminant concentration in the clay.

Other objects and advantages of the invention, if not set forth specifically herein, will become readily apparent from the following description of the invention and the preferred embodiments thereof.

SUMMARY OF THE INVENTION

The instant invention is an improved continuous process for regulating the amount of leach compound employed in leaching a dispersed kaolin clay aqueous slurry for removing color impurities therein by oxidation-reduction potentiometric measurement of the leach reaction to provide high grade kaolin clay products having desirable optical properties and improved minimum viscosities upon dispersion with a minimum amount of leach compound, thereby preventing overleaching thereof. The inventive method comprises forming a continuous flowing stream of a finely divided kaolin clay aqueous slurry, adding to the slurry stream a leaching compound capable of reducing insoluble salts present to a soluble form, said leaching compound comprising a compound containing an active $(S_2O_4)^=$ group or a compound capable of liberating such group in the slurry, measuring the oxidation-reduction electromotive force potential of the leaching reaction at a specified time period selected at least about 20 minutes after the leach compound addition, the electromotive force potential being measured by inserting the electrodes of an oxidation-reduction potentiometric cell into the flowing stream and reading the electric potential between said electrodes in the stream, and adjusting, if necessary, the amount of leach compound added to the aqueous clay slurry to provide an electromotive force potential reading value of between about −450 to about −300 millivolts, as read with a saturated calomel cell electrode and a dithionite-conditioned platinum electrode assembly.

DESCRIPTION OF THE PREFERRED EMBODIMENTS

It is known that the variation of the plant operation parameters of percent clay solids, particle size, temperature, acidity, and the like affect the leach reaction to some extent. It is also known that potentiometric measurements are sensitive to parameter variations. Therefore, it is preferred that the instant inventive process be carried out under conventional continuous clay leaching conditions. On the other hand, experiments have shown that periodic changes in the aforementioned variables which normally occur in plant operations do not significantly affect the leach reaction or potentiometric measurements to such an extent that they cannot be repeated or maintained and depended upon. Therefore, slight deviations in the leaching parameters such as those which might be encountered in plant production would not appear to present any problems.

Turning now to more specific details of the invention, finely divided particulate kaolin clay, refined from the mine by conventional procedures to remove coarse impurities, is first dispersed in water to form a continuous flowing stream of an aqueous clay slurry. Although the percent solids (clay) in the clay-water suspension may vary, particularly advantageous results are obtained when the slurry contains from about 10 to about 35 percent clay solids, by weight. The inventive process is especially applicable to slurries having about 25 to about 35 percent clay solids, by weight. In addition, it is preferred that the particle size of the refined clay be between about 70 percent and 98 percent by weight at less than 2 microns.

A leaching compound containing an active $(S_2O_4)^=$ group or a compound capable of liberating such groups is then added to the aqueous clay slurry stream. While any of the known leaching agents may be employed, we prefer to use sodium or zinc dithionite. In addition, it is preferred to add the dithionite leaching agent to the clay slurry in the form of an aqueous solution; however, the dithionite leaching agent may be added in dry form.

The particular amount of dithionite added is dependent upon the severity of discoloration of the kaolin clay being leached, and is usually first determined empirically in the laboratory by leaching several samples of the clay with various leach dosages as described hereinbefore. The particular leach dosage providing optimum brightness is then employed. Experience has shown that zinc or sodium dithionite can usually be added at a rate within the range of about 3 to about 10 pounds of dithionite per ton of kaolin clay being treated. Under optimum conditions, the dithionite may be added within the range of about 5 to about 8 pounds dithionite per ton of clay.

The pH of the leach-clay slurry stream is adjusted to within the conventional operating range of pH 3–4.5 by any procedure known in the art. For example, the pH can be adjusted by addition of a flocculating agent, such as alum and/or mineral acid, such as hydrochloric acid, sulfuric acid, etc., to the clay slurry either during or after the dithionite leaching compound is added. Normally, the pH is adjusted and maintained within the range of about 4.0–4.5. In addition, it is preferred to carry out the leach reaction at a temperature maintained within the range of about 100° to 160°F.

The leach compound-clay slurry stream is agitated to insure maximal contact of the leaching compound with the iron contaminants in accordance with conventional clay leaching procedures. Accordingly, the stream is mildly agitated so as to prevent vortexing or the intake of air into the reaction mixture, which produces side reactions and results in leach compound degradation along with iron contaminant reversion.

The electromotive force potential or oxidation-reduction (redox) potential of the leaching reaction is then measured at a specific time period selected at least about 20 minutes after the leach compound was added to the flowing stream of clay slurry. This electromotive force potential is measured by inserting the electrode assembly of an oxidation-reduction potentiometric cell into the flowing leach-slurry stream and reading the electric potential between the electrodes in the stream. There are many types of oxidation-reduction potentiometric cells for measuring the electromotive force potential in liquid reaction mixtures commercially available which provide instantaneous redox potential measurements. Generally, the potentiometric cells are comprised of a standard reference electrode and a measuring electrode connected to a potentiometer. We prefer to measure the electromotive force potential by inserting into the leach-clay slurry stream an electrode assembly comprised of a saturated calomel cell electrode (S.C.E.) and a special platinum metal electrode conditioned by previous prolonged contact with a strong dithionite solution (conditioned by immersion in a 1 percent by weight active aqueous solution of zinc dithionite for 24 hours). However, it will be understood that any commercially available oxidation-reduction potentiometric cell assemblies commercially available that would be stable in the leach system could be employed in the practice of the present invention. Any reproducible metal electrode inert to the leach compound could serve as the sensing electrode. EMF potential readings of various electrode assemblies can be easily calculated by known methods to compare with readings provided by the preferred electrode assembly described hereinabove.

Potentiometric titrations of the clay leaching reaction, as read with a redox potentiometric cell having the preferred electrode assembly of a saturated calomel reference electrode and a dithionite-conditioned platinum measuring electrode, yield a terminal potential of about −300 to about −450 millivolts when the major portion of the ferric iron has been reduced. Moreover, experiments have shown, that, under optimum plant operating conditions, substantially complete reduction of the ferric iron contaminants in the clay is obtained after the dithionite leach compound has been in contact with the aqueous clay slurry for at least about 20 minutes. Therefore, by measuring the electromotive force potential in the leach compound-clay slurry stream at a time period of at least 20 minutes after leach compound addition, optimum leaching of the kaolin clay with a minimum amount of leaching compound can be accomplished by continuously adjusting the amount of leach compound added to the clay slurry stream to maintain an electromotive force potential reading value of between about −450 to about −300 millivolts, as read with the preferred electrode assembly. For example, should the redox reading be more negative than about −450 millivolts, the amount of leach compound added to the clay slurry stream must be reduced. Accordingly, should a reading be below about −300 millivolts, additional leach compound must be added to the clay slurry stream to maintain a potential of between about −450 to about −300 millivolts for optimum leaching. We have found that, through maintaining the redox reading to within the described range, as read with the preferred electrode assembly described hereinabove, optimum leaching of kaolin clays is obtained through the employment of a minimum amount of leaching compound which accordingly provides a finished clay product having desirable brightness, along with substantially improved minimum viscosities upon dispersion.

Experiments have also shown that, under optimum plant operating conditions employing optimum amounts of leaching compound, the electromotive force potential of the leach compound-clay slurry stream becomes more positive very slowly. Thus, the potential in the stream can be measured at any selected time period of at least 20 minutes after initial leach compound addition up until the stream is filtered, which is usually about 90 to 200 minutes after said leach addition, depending upon the filtration rate of the clay slurry. It is desirable to measure the potential at a minimal time to prevent a large volume of clay from being leached before the potential measurement can be made. Preferably, the potential is measured at a time period selected between about 20 to 50 minutes after initial leach addition for substantially complete reduction of the iron contaminants is obtained within this time period.

In the preferred embodiment of the invention, an aqueous solution of a dithionite leaching compound is added to an aqueous clay slurry flowing stream of 25–35 percent clay solids content, by weight, at a rate selected from within the range of about 5 to about 8 pounds dithionite per ton of clay and the pH of the flowing stream is adjusted to about 4.0 to about 4.5 by the addition of a flocculating agent such as alum. The flowing stream is continuously pumped through appropriate conduits through a series of holding or leaching tanks at a constant flow rate with mild agitation to prevent vortexing or the intake of air into the mixture. The electrode assembly of a redox potentiometric cell is inserted into the flowing stream at a point downstream whereat leach contact time would equal about 20 – 50 minutes and the electromotive force potential at that point is measured. In the event that the electromotive force potential reading value is outside the range of about −450 to about −300 millivolts, as read with a saturated calomel cell electrode and a dithionite-conditioned platinum electrode, the amount of dithionite leach compound being added to the aqueous clay slurry is adjusted accordingly. Preferably, the leach compound addition is continuously adjusted to maintain a redox potential of approximately −400 millivolts. The leach reaction is discontinued by dewatering, washing, filtering and the like, per conventional procedures, to remove soluble impurities from the suspended leached clay. The leached clay can then be dried in accordance with conventional procedures.

It will be readily apparent that the inventive process is applicable to providing automatic or semi-automatic operation. For example, the oxidation-reduction potentiometric cell employed to measure the electromotive force potential in the leach compound-clay slurry mixture can be connected with commercially available audio and/or visual alarm devices to warn the operator when excess or inadequate leach compound is being added for the leaching of a particular clay slurry. Alternatively, the potentiometric cell may be connected in a closed-loop controller system with appropriate metering devices for automatically controlling the rate of leach compound addition. Such automatic and semi-automatic process apparatus is available commercially from several sources, e.g., Leeds and Northrup Company, Universal Interlock, Inc. and The Foxboro Company.

As will be more fully illustrated by the following examples, the present invention overcomes the disadvantages of the prior art. While particularly advantageous method embodiments have been set forth in the Examples, they are intended to illustrate the invention and not to limit it thereto.

EXAMPLE I

A sample of a finely divided kaolin clay (80 percent less than 2 microns) was dispersed in water to form a slurry containing about 30 percent solids content. Separate portions of the sample were leached by the addition of differing amounts of zinc dithionite recited in the following Table 1 along with pH adjustments by the addition of 6 pounds of alum per ton of clay. The leach reaction for each portion was continued with stirring for approximately 30 minutes, at which time an oxidation-reduction (redox) measurement was taken by inserting into the leach reaction mixtures an electrode assembly comprised of a saturated calomel electrode and a special platinum metal electrode attached to a laboratory pH potentiometer. The special platinum electrode had been preconditioned by immersion in a 1 percent by weight zinc dithionite solution for 24 hours. The leach reaction of each portion was then discontinued by conventional dewatering, filtration, washing and drying procedures. The brightness of each dried leached portion was measured, employing a G.E. Brightness Tester. In addition, minimum viscosities of each portion were measured upon dispersion to 70 percent solids. The results are set forth in the following Table 1.

Table 1

Results on Kaolin Clay Leached With Varying Dosages

| Portion No. | Leach Dosage lbs./ton ZnS$_2$O$_4$* | Brightness % | Minimum Viscosity, 70% Solids | | Redox Reading After 30 Minutes Leaching,-mv |
| | | | Brookfield cps. | Hercules dynes/1100 rpm | |
| --- | --- | --- | --- | --- | --- |
| 1 | 1.0 | 83.90 | 118 | 5.6 | 35 |
| 2 | 2.0 | 84.95 | 123 | 6.6 | 43 |
| 3 | 3.0 | 86.25 | 130 | 11.2 | 141 |
| 4 | 4.0 | 87.15 | 155 | 11.8 | 173 |
| 5 | 4.5 (desirable leaching conditions) | 87.20 | 173 | 12.0 | 347 |
| 6 | 5.0 | 87.15 | 207 | 14.2 | 460 |
| 7 | 6.0 | 87.10 | 233 | 17.3 | 480 |

*All clays flocculated with 6 lbs./ton alum.

As illustrated in Table 1, optimum leaching was obtained on this particular clay sample by employing a leach dosage of about 4.5 pounds zinc dithionite per ton of clay (Portion 5). These optimum leaching conditions also provided a redox reading after 30 minutes leaching of about −347 millivolts. The data further clearly shows that overleaching this clay (Portions 6 and 7) results in an increase in viscosities upon dispersion without any increase in percent brightness. Inadequate leach dosages (Portions 1–4) provided redox readings below −300 millivolts and lower brightness measurements.

EXAMPLE II

Several kaolin clay leaching runs were conducted under actual continuous plant operating conditions employing the inventive process for regulating the amount of leaching compound added to the clay slurry for the leaching reaction. Samples of the kaolin clay leached in each run were first tested in the laboratory under standard laboratory operating procedures to determine optimum brightness and optimum leach dosage per ton of clay. in each run, a finely divided kaolin clay (90–92 percent less than 2 microns) was dispersed in water in a mixing tank to form an aqueous slurry flowing stream of about 30 percent solids, by weight. An aqueous solution of zinc dithionite was then added to the clay slurry upon entering the mixing tank to provide the optimum dosage of pounds dithionite per ton of clay as determined in the laboratory. The mixture of leaching compound-clay slurry was then continuously pumped at a substantially constant rate through a series of holding or leaching tanks wherein the mixture was mildly agitated. The electrode assembly of the oxidation-reduction potentiometric cell as described in Example I was inserted at a point downstream which, as determined by the flow rate of the mixture, represented approximately 43 minutes after the dithionite was initially added to the clay slurry in the mixing tank. The redox potential between the electrodes was measured on the potentiometer and recorded. The amount of zinc dithionite being added to the aqueous clay slurry was then adjusted in an attempt to maintain an average electromotive force potential of about −400 millivolts over each run. The leaching reaction was discontinued in the conventional manner by dewatering, washing, filtering and drying the resulting leached clay product. After each run, the average leach dosage provided by adjusting leach addition with potentiometric measurement, along with brightness of the dried, refined clay product were determined and recorded. The results are set forth in the following Table 2.

Table 2

| Sample No. | LABORATORY RESULTS | | AVERAGE PLANT RESULTS | | | DIFFERENCE | |
| | Optimum Leach Dosage,lbs./ton | Optimum Brightness[1] | Potentiometric Reading -mv | Leach Dosage lbs./ton | Brightness[1] | Leach Dosage lbs./ton | Brightness |
| --- | --- | --- | --- | --- | --- | --- | --- |
| 1 | 6.2 | 88.10 | 358 | 6.0 | 87.80 | −0.2 | −0.30 |
| 2 | 5.5 | 88.65 | 419 | 6.0 | 88.60 | +0.5 | −0.05 |
| 3 | 6.5 | 88.45 | 368 | 7.8 | 88.45 | +1.3 | 0.00 |
| 4 | 5.5 | 88.40 | 396 | 5.3 | 87.90 | −0.2 | −0.50 |
| 5 | 4.5 | 88.40 | 413 | 5.3 | 88.20 | +0.8 | −0.20 |
| 6 | 6.0 | 89.15 | 433 | 6.1 | 89.15 | +0.1 | 0.00 |
| 7 | 6.0 | 89.20 | 400 | 5.8 | 88.80 | −0.2 | −0.40 |
| 8 | 5.0 | 88.70 | 421 | 4.8 | 88.50 | −0.2 | −0.20 |
| 9 | 6.0 | 88.35 | 430 | 5.7 | 88.30 | −0.3 | −0.05 |
| 10 | — | — | 363 | 5.3 | — | — | — |
| 11 | — | — | 404 | 4.9 | — | — | — |
| 12 | 5.5 | 88.45 | 369 | 5.4 | 88.40 | −0.1 | −0.05 |
| 13 | 6.0 | 88.00 | 387 | 3.9 | 87.80 | −2.1 | −0.20 |
| 14 | 6.0 | 87.20 | 371 | 5.6 | 87.20 | −0.4 | 0.00 |
| 15 | 6.0 | 86.70 | 391 | 5.5 | 86.20 | −0.5 | −0.50 |
| 16 | 5.5 | 87.50 | 415 | 5.1 | 87.40 | −0.4 | −0.10 |
| 17 | 5.5 | 87.45 | 400 | 5.1 | 87.20 | −0.4 | −0.25 |
| Average (excluding 10 and 11) | 5.7 | 88.18 | 399 | 5.6 | 87.99 | −0.1 | −0.19 |

[1] Obtained on Elrepho Brightness Tester

As illustrated in Table 2, the adjustment of leaching compound employed in commercial plant leaching procedures by potentiometric measurement of the leach reaction, provides a finished clay product having a brightness value substantially comparable to optimum brightness obtained by laboratory testing with a comparable amount of leach compound. This is especially significant in view of the fact that under conventional plant leaching operations, an excess amount of leach over that considered by laboratory tests to be optimum is frequently employed.

EXAMPLE III

In this example, two clay leaching runs were conducted employing the conventional leaching procedure described in Example II. In the first run, under routine plant manual control, the clay slurry stream (30 percent solids, by weight) was leached with a leach dosage of 7.3 pounds zinc dithionite/ton of clay. In run No. 2, the clay slurry stream (30 percent solids) was leached with 3.4 pounds zinc dithionite/ton of clay. The first run was continuously overleaching the clay, whereas, the second run was resulting in an underleaching of the clay mixture. Each run was then supplemented by employing the potentiometric cell described in Example I to continuously adjust the zinc dithionite addition to correspond to an electric potential reading of approximately −400 millivolts. The following Table 3 illustrates the effectiveness of the inventive process for continuous control of the amount of leaching compound employed in a continuous clay leaching process.

clay (90–92 percent less than 2 microns) in water to form aqueous slurries containing about 30 percent solids content, by weight. To the slurries were added specified amounts of zinc dithionite leaching compound (as determined by present operating procedures) along with sufficient amounts of alum to adjust the pH of the mixtures to about pH 4.2. The leach reaction mixture streams were continuously pumped through a plurality of holding tanks, with stirring as described in Example II. After about 108 minutes of leach contact time, the leach-clay slurry mixtures were dewatered, washed, filtered and dried in accordance with conventional operating procedures. These conventional leaching procedures were continued for each run for approximately 4 hours with samples of each finished clay product being taken for the testing of percent brightness as obtained on a G. E. Brightness Tester. After approximately 4 hours of operation for each run, oxidation-reduction potentiometric readings, employing the potentiometric cell described in Example I were begun and the amounts of zinc dithionite added to the aqueous clay slurries were adjusted to provide average electric potential readings of about −400 millivolts after about 43 minutes of leach contact time. The brightness of finished clay samples provided by redox control of dithionite addition was measured for each run and compared to the brightnesses of the samples

TABLE 3

| Time after Redox Monitoring Started, Minutes | Flow Rate, gpm | Retention Time Before Reading, Minutes | Zinc Dithionite Leach Dosage, pounds/ton | Redox Reading, Negative Millivolts |
| --- | --- | --- | --- | --- |
| First Run | | | | |
| 0* | 105 | 50 | 7.3 | 434 |
| 25 | 105 | 50 | 6.9 | 440 |
| 60 | 105 | 50 | 5.3 | 420 |
| 90 | 122 | 43 | 4.7 | 240 |
| 120 | 122 | 43 | 6.4 | 305 |
| 170 | 122 | 43 | 6.8 | 398 |
| 245 | 122 | 43 | 5.4 | 352 |
| 270 | 122 | 43 | 6.3 | 380 |
| 290 | 122 | 43 | 6.3 | 435 |
| 350 | 122 | 43 | 4.9 | 405 |
| 380 | 122 | 43 | 4.9 | 315 |
| 425 | 122 | 43 | 5.6 | 360 |
| Second Run | | | | |
| 0* | 142 | 37 | 3.4 | 60 |
| 45 | 142 | 37 | 7.0 | 395 |
| 75 | 142 | 37 | 4.6 | 425 |
| 100 | 142 | 37 | 4.6 | 362 |
| 135 | 142 | 37 | 5.5 | 370 |
| 195 | 142 | 37 | 5.5 | 400 |
| 260 | 142 | 37 | 5.3 | 400 |
| 320 | 142 | 37 | 5.3 | 430 |
| 360 | 142 | 37 | 5.5 | 425 |
| 410 | 142 | 37 | 5.5 | 385 |
| 440 | 142 | 37 | 5.9 | 450 |

*(Routine plant manual control)

EXAMPLE IV

In this Example, a comparison was made between the conventional continuous process for the leaching of kaolin clays wherein a clay sample is continuously leached with a constant amount of dosage of leaching compound, to the instant inventive process wherein the amount of leaching compound is controlled by measuring the redox potential and adjusting the amount of leach compound added to the aqueous clay slurry to maintain a redox potential between about −450 to −300 millivolts, preferably −400. Several runs were conducted by first dispersing a finely divided kaolin obtained prior to redox control (conventional method). The results of the comparison are set forth in the following Table 4.

It will be noted that in Run Nos. 1 and 2, the average brightnesses obtained by the existing method (determination of optimum leach dosage by laboratory testing) were only 85.5 and 85.2, the respectively. Such brightness values were considerably lower than those desirable, indicating that the optimum leach dosage determined by laboratory testing was incorrect, resulting in underleaching of the respective clay samples. As shown in Table 4, when the redox method for leach control was employed after the initial 4 hours of each run, the average amounts of leach added increased substantially. However, the brightness values of each run also increased substantially, indicating that the existing method was resulting in a underleaching of the clay. Runs 1 and 2 are included in Table 4 to illustrate that the process of controlling the amount of leachant employed in a continuous process results in improved control of optimum brightness.

TABLE 4

Comparison of Conventional Leaching Method and Redox Control Method

| | Leach Tank Brightnesses[1] (from Control Laboratory) | | | Amount of Leach Added, pounds/ton | | |
|---|---|---|---|---|---|---|
| Run No. | Existing Method | Redox Method | Difference | Existing Method | Redox Method | Difference |
| 1 | 85.5 | 87.0 | +1.5 | 2.5 | 6.0 | +3.5 |
| 2 | 85.2 | 86.9 | +1.7 | 3.5 | 7.8 | +4.3 |
| 3 | 87.1 | 87.2 | +0.1 | 5.9 | 4.8 | −1.1 |
| 4 | 87.0 | 87.0 | 0.0 | 5.4 | 5.4 | 0.0 |
| 5 | 86.9 | 87.2 | +0.3 | 6.3 | 3.9 | −2.4 |

[1]Obtained on G. E. Brightness Tester

As illustrated in Table 4, the control of the amount of leaching compound added to a clay slurry be measuring redox potential in the leach compound-clay mixture greatly improved the brightness of the clay as established from the leaching reaction as well as prevented the over or underleaching of the clay.

We claim:

1. An improved method for continuously leaching a dispersed kaolin clay aqueous slurry for removing color impurities therein to provide kaolin clay products having improved optical and rheological properties with an optimum amount of leach compound, said method comprising:
   a. forming an aqueous slurry of a finely divided kaolin clay;
   b. adding to said aqueous clay slurry a leaching compound capable of reducing insoluble salts present in said clay slurry to a soluble form, said leaching compound comprising a compound containing an active $(S_2O_4)^=$ group or a compound capable of liberating such groups in said slurry;
   c. adjusting the pH of the slurry to between about 3.0 to 4.5 by the addition of a sufficient amount of a flocculating agent;
   d. measuring the oxidation-reduction potential in the leach compound-clay slurry mixture at a specified time period selected at least 20 minutes after said leach compound addition, said oxidation-reduction potential being measured by inserting the electrode assembly of an oxidation-reduction potentiometric cell into said leach-clay slurry mixture and reading the electric potential between said electrodes in said mixture; and
   e. adjusting the amount of the leach compound added to said aqueous clay slurry to provide an oxidation-reduction potential reading value of about −450 to about −300 millivolts, as read with a saturated calomel cell electrode and a dithionite-conditioned platinum electrode assembly.

2. A continuous process for improving the leaching of dispersed kaolin clay aqueous slurries with an optimum amount of leaching compound to provide kaolin clay products having improved optical and rheological properties, said method comprising:
   a. forming a flowing stream of an aqueous kaolin clay slurry;
   b. adding to said aqueous clay slurry a dithionite leaching compound to form a leach reaction mixture;
   c. adjusting the pH of the mixture to between about 3.0 and 4.5;
   d. measuring the oxidation-reduction potential in the mixture at a specified time period selected at least 20 minutes after addition of said leaching compound, said oxidation-reduction potential being measured by inserting the electrode assembly of an oxidation-reduction potentio-metric cell into said flowing stream and reading the electric potential between said electrodes; and
   e. adjusting the amount of the leaching compound added to said aqueous clay slurry to provide an oxidation-reduction potential reading value of about −450 to about −300 millivolts, as read with a saturated calomel cell electrode and a dithionite-conditioned platinum electrode assembly;
   whereby improved optical properties and dispersed clay viscosities are maintained.

3. In a continuous method for producing kaolin clay products having improved optical properties which comprises forming a continuous flow stream of a dispersed kaolin clay aqueous slurry, leaching said slurry with dithionite leaching agent, adjusting the pH of the slurry to about 3.0 to 4.5, and dewatering the resultant slurry mixture to remove soluble salts, the improvement comprising:
   controlling the amount of leaching compound added to said aqueous clay slurry to thereby obtain a finished clay product having improved optical properties and viscosities upon dispersion with an optimum amount of leaching compound, the amount of said leaching compound added to said slurry being controlled by
   measuring the oxidation-reduction potential in the slurry mixture at a point in the continuous flow stream after a selected time period selected at least 20 minutes after addition of said leaching compound has elapsed, said oxidation-reduction potential being measured by inserting the electrode assembly of an oxidation-reduction potentiometric cell into said slurry mixture and reading the electric potential between said electrodes; and
   adjusting the amount of leaching compound added responsive to such measurement to maintain the potential between about −450 and −300 millivolts as measured with a saturated calomel cell electrode and a dithionite-conditioned platinum electrode assembly.

4. The improved method of claim 1, wherein:
the oxidation-reduction potential in the leach compound-clay slurry mixture is measured at a time period of 20–50 minutes after said leach compound addition.

5. A process in accordance with claim 1, wherein:
an aqueous clay slurry is formed containing from about 10 to about 35 percent by weight clay solids.

6. A process in accordance with claim 1 wherein said leaching compound is added to said aqueous clay slurry at a rate within the range of about 3 to about 10 pounds leach compound per ton of clay.

7. A process in accordance with claim 6 wherein said leaching compound is zinc dithionite or sodium dithionite.

8. The improved method of claim 2 wherein:
the oxidation-reduction potential in the leach compound-clay slurry mixture is measured at a time period of 20–50 minutes after said leach compound addition.

9. A process in accordance with claim 2, wherein:
an aqueous clay slurry is formed containing from about 10 to about 35 percent by weight clay solids.

10. A process in accordance with claim 2 wherein said leaching compound is added to said aqueous clay slurry at a rate within the range of about 3 to about 10 pounds leach compound per ton of clay.

11. The improved method of claim 3, wherein:
the oxidation-reduction potential in the leach compound-clay slurry mixture is measured at a time period of 20–50 minutes after said leach compound addition.

12. A process in accordance with claim 3 wherein:
an aqueous clay slurry is formed containing from about 10 to about 35 percent by weight clay solids.

13. A process in accordance with claim 3 wherein said leaching compound is added to said aqueous clay slurry at a rate within the range of about 3 to about 10 pounds leach compound per ton of clay.

* * * * *